United States Patent
Batiz

(10) Patent No.: US 10,250,476 B2
(45) Date of Patent: Apr. 2, 2019

(54) IDENTIFYING MODIFICATIONS TO TECHNICAL CHARACTERISTICS OF A COMMUNICATION CHANNEL TO ALTER USER PERCEPTION OF COMMUNICATION CHANNEL PERFORMANCE

(71) Applicant: CASE ON IT, S.L., Madrid (ES)

(72) Inventor: Agustin Batiz, Madrid (ES)

(73) Assignee: CASE ON IT, S.L., Madrid (ES)

( * ) Notice: Subject to any disclaimer, the term of this patent is extended or adjusted under 35 U.S.C. 154(b) by 93 days.

(21) Appl. No.: 15/213,367

(22) Filed: Jul. 18, 2016

(65) Prior Publication Data
US 2018/0019936 A1  Jan. 18, 2018

(51) Int. Cl.
*H04L 12/26* (2006.01)
*H04L 29/08* (2006.01)
*H04W 72/04* (2009.01)
*H04W 24/10* (2009.01)

(52) U.S. Cl.
CPC ........ *H04L 43/0876* (2013.01); *H04L 43/062* (2013.01); *H04L 43/12* (2013.01); *H04L 67/18* (2013.01); *H04W 72/048* (2013.01); *H04W 24/10* (2013.01)

(58) Field of Classification Search
None
See application file for complete search history.

(56) References Cited

U.S. PATENT DOCUMENTS

2004/0214577 A1* 10/2004 Borst ............... H04W 16/18 455/446
2010/0023635 A1   1/2010 Labonte et al.
2010/0057560 A1* 3/2010 Skudlark ............ G06Q 30/02 705/14.49

(Continued)

FOREIGN PATENT DOCUMENTS

| CN | 104348651 A | 2/2015 |
| CN | 104680428 A | 6/2015 |
| WO | WO 02/50717 A2 | 6/2002 |

OTHER PUBLICATIONS

PCT International Search Report, PCT Application No. PCT/IB2017/000907, dated Dec. 6, 2017, 15 pages.

*Primary Examiner* — Michael J Moore, Jr.
(74) *Attorney, Agent, or Firm* — Fenwick & West LLP

(57) ABSTRACT

Probes are coupled to a network via one or more communication channels. The probes capture a set of technical characteristics of the communication channel (e.g., signal intensity, signal quality, signal to noise ratio, etc.), which may include characteristics of data exchanges between third party systems and the probes. Captured characteristics are provided to an online system, which obtains information from users who are communicating content via the communication channel regarding user perception of content transmission or receipt. Based on the received characteristics and information describing user perception, the online system generates a value of a performance metric for the communication channel associated with a set of users having one or more common characteristics. The online system may use (Continued)

values of the performance metric for different technical characteristics to evaluate effects of modifying a technical characteristic of the communication channel on perception of the communication channel by users in the set.

21 Claims, 3 Drawing Sheets

(56) References Cited

U.S. PATENT DOCUMENTS

| | | |
|---|---|---|
| 2014/0280705 A1 | 9/2014 | Liik et al. |
| 2015/0131483 A1* | 5/2015 | Colban ................ H04W 48/16 370/254 |
| 2016/0036815 A1 | 2/2016 | Dharawat |
| 2016/0125419 A1 | 5/2016 | Arslan |
| 2016/0134576 A1 | 5/2016 | Ju et al. |
| 2016/0234078 A1* | 8/2016 | Jana ........................ H04L 67/02 |
| 2017/0200087 A1* | 7/2017 | Mascaro ................ G06Q 40/12 |
| 2018/0005161 A1* | 1/2018 | Cong ............... G06Q 10/06398 |

* cited by examiner

IDENTIFYING MODIFICATIONS TO TECHNICAL CHARACTERISTICS OF A COMMUNICATION CHANNEL TO ALTER USER PERCEPTION OF COMMUNICATION CHANNEL PERFORMANCE

BACKGROUND

This invention relates generally to determining performance of communication channels, and more particularly to evaluating effects of technical characteristics of a communication channel with user perception of the communication channel's performance.

Various systems provide an increasing amount of content to client devices for presentation to users via one or more networks. Client devices are coupled to a network via one or more communication channels to obtain content provided by various systems. For example, a system coupled to a network provides audio or video data to client devices that are coupled to the network via one or more communication channels, allowing users of the client devices to access the audio or video data.

While systems providing content or systems that maintain networks through which content is distributed may capture technical data describing performance of the networks, user perception of a communication channel with a network is affected by various factors outside of the network. For example, a system providing a network is unable to control content or other services requested by a user through a client device that may affect the user's interaction with content provided via the communication channel with the network. Additionally, configuring communication channels to optimize transmission of content between a system and a client device is increasingly complex, making it difficult for a system to configure communication of content to various client devices in different locations or communicating via different types of communication channels. Further, communication channels configuration or operation, as well as client device functionality or usage, may change over time, making it difficult to optimize use of client devices or communication channels over time. For example, over time, users may request more video or dynamic content from mobile devices, which may warrant modification of how a system communicating the content is configured over time. Accordingly, conventionally obtained technical data describing performance of a communication channel provides little information about how the technical data relates to user perception of the communication channel's performance. Hence, a system providing content through or maintaining networks are unable to accurately identify modifications to one or more technical characteristics of communication channel with a network to improve how users perceive performance of the communication channel; such improved perception may increase user consumption of content through the communication channel, increasing revenue to the system.

SUMMARY

Probes are coupled to a network via one or more communication channels and capture a set of technical characteristics of the communication channel. Example technical characteristics of the communication channel include: signal intensity, signal quality, signal to noise ratio, or any other suitable information. Captured technical characteristics of the communication channel are associated with one or more physical components of the communication channel, allowing subsequent identification of a component of the communication channel corresponding to captured technical characteristics. For example, captured technical characteristics are associated with an identifier of an antenna or of an access point included in the communication channel. Different technical characteristics may be captured for different types of communication channels. For example, if the communication channel uses a mobile telephone network, technical characteristics describing delivery of data packets communicated via the communication channel are captured by one or more probes. As another example, if the communication channel uses a local area network, technical characteristics describing physical layer messages describing conversion of data from an application into a format for transmission by the local area network are captured by one or more probes. Hence, the probes allow capture of technical characteristics specific to technologies used by different communication channels.

A probe may be coupled to a client device used by a user and establishes a connection between the client device and a communication channel used by the client device to transmit and to receive data via the communication channel. As data is exchanged between the client device and one or more third party systems via the communication channel, the probe captures technical characteristics describing communication of data via the communication channel. This allows technical characteristics captured by the probe to describe the communication channel when the user is exchanging information via the communication channel.

Additionally, probes may be coupled to the network via a communication channel but not coupled to client devices. Probes that are not coupled to client devices may communicate data via the communication channel and capture technical characteristics of the communication channel or may capture technical characteristics of the communication channel. A probe not coupled to a client device may passively capture technical characteristics of the communication channel to which the probe is coupled or may communicate data through the communication channel and capture technical characteristics of the communication channel when data is communicated through the communication channel. In some embodiments, probes may be repositioned to different physical locations to capture technical characteristics of the communication channel at different physical locations. For example, probes are included in vehicles and capture technical characteristics of the communication channel from different physical locations as the vehicles move to different physical locations. In some embodiments, the probes are located in public transportation vehicles, or other vehicles travelling along a particular route of physical locations, to capture technical characteristics of the communication channel at different physical locations along routes traveled by the public transportation vehicles. Additionally or alternatively, probes are included in other vehicles (e.g., taxis, personal vehicles, or ridesharing vehicles) that do not travel along particular routes to capture technical characteristics of the communication channel at different physical locations.

Additionally, one or more probes may actively communicate data via the communication channel and capture technical characteristics of the communication channel based on data communicated to and from the probe via the communication channel. For example, a probe includes instructions that, when executed by a processor included in the probe, exchange data between the probe and one or more third party systems via the communication channel. The probe captures technical characteristics of the communication channel as the data is exchanged between the probe and the one or more third party systems. Technical characteristics of the communication channel captured by the probe may include characteristics of the third party system, allowing the probe to account for the third party system when data is exchanged.

The probes communicate the captured technical characteristics of the communication channel to an online system. In various embodiments, a probe communicates technical characteristics of the communication channel along with a physical location where the probe captured the technical characteristics to the online system, a time when the probe captured the technical characteristics, characteristics of a client device that communicated information via the communication channel, or any other suitable information. Additionally, the online system communicates instructions to one or more probes that control operation of the probes. For example, the online system communicates instructions to a probe to power on, to power down, or to reset; instructions communicated to the probe may also specify protocols for capture of technical characteristics.

Additionally, the online system obtains characteristics of users associated with client devices capable of communicating via the communication channel. In various embodiments, the obtained characteristics comprise demographic information of various users (e.g., gender, age range, location, etc.), economic information for various users, information from profiles maintained by various third party systems (e.g., social networking systems) for users. The characteristics may be obtained based on information obtained by a probe from a client device that communicated data via the communication channel, from information associated with users by a third party system operating the communication channel, or from any other suitable source or combination of sources. Characteristics of users associated with the client devices may be obtained from one or more other sources, allowing the online system to indirectly obtain the characteristics. For example, the online system obtains information from one or more third party systems maintaining demographic information for various physical locations and infers characteristics for users for different physical locations from which technical characteristics are received by the online system from the information obtained from the one or more third party systems. Hence, the online system may obtain characteristics of users based on information corresponding to users of client devices coupled to various probes as well as by inferring information maintained by third party systems for different physical locations.

The online system also obtains information describing user perception of content provided to the client devices via the communication channel. For example, the online system provides surveys to various users of client devices requesting user input regarding content provided to the client devices via the communication channel. Responses to the survey comprise the information describing user perception of content provided to the client devices. Information describing user perception of content provided via the communication channel may be obtained at different intervals, allowing the online system to maintain information describing user perception of content at different times. Information describing a user's perception of content provided by the communication channel is stored in association with characteristics of the user, such as the characteristics described above, allowing the online system to identify information describing perception of content by users having various characteristics.

From the information describing user perception of content provided by the communication channel, the online system generates models for one or more sets of users that correlate values of a performance metric describing user perception of the communication channel with captured technical characteristics of the communication channel for the sets of users. A set of users includes users having one or more common characteristics, and a model for the set of users correlates values of the performance metric for the communication channel with different captured technical characteristics of the communication channel based on information describing perception of content by users in the set (or by users having the characteristic common to users in the set). In various embodiments, the online system obtains training data describing perception of content by users having the one or more common characteristics of users in the set for different technical characteristics of the communication channel, and the online system generates the model for the set of users based on the training data. Different models may be generated for different sets of users, accounting for different perceptions of content by users with different characteristics.

The online system stores the generated models, subsequently allowing determination of perception of content provided by the communication channel to users in a particular set for specified technical characteristics of the communication channel. Hence, a user may select a set of users and specify technical characteristics of the communication channel, and the online system determines a performance metric for the selected set of users based on the specified technical characteristics from the model. Because the performance metric describes perception of content provided the communication channel, the online system allows the user to estimate how the specified technical characteristics affect perception of content provided by the communication channel. As another example, for a set of users, a user identifies a value of the performance metric, and the online system determines technical characteristics for the communication channel to achieve the performance metric based on the model for the set of users. Further, for a specified performance metric and a specified set of technical characteristics for the communication channel, the models allow the online system to identify a set of users likely to have perceptions of content provided by the communication channel using the specified set of technical characteristics that are described by the specified performance metric.

Similarly, the one or more models allow the online system to identify potential modifications to a communication channel to improve user perception of content communicated via the communication channel. For example, the online system identifies modifications to one or more technical characteristics of the communication channel resulting in at least a threshold performance metric of the communication channel for a particular set of users. In some embodiments, the online system provides estimates of time or costs for a system maintaining the communication channel to implement the modified one or more technical characteristics of the communication channel. The online system may estimate a benefit to the system maintaining the communication channel for modifying one or more of the technical characteristics of the communication channel (e.g., an increase in revenue from users, an increase in user perception of content provided by the communication channel, etc.); in some embodiments, the online system ranks modifications to various technical characteristics of the communication channel based on the estimated benefit to the system maintaining the communication channel and provides the ranking of the modifications to the system maintaining the communication channel. The ranking may be based on an estimated benefit of various modifications to one or more attributes, such as impact on user perception, increase in revenue, time to implement the modifications, or any other suitable attribute. As another example, the online system identifies a set of users or a common of characteristic of users for whom existing technical characteristics of the communication channel result in at least the threshold performance metric.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
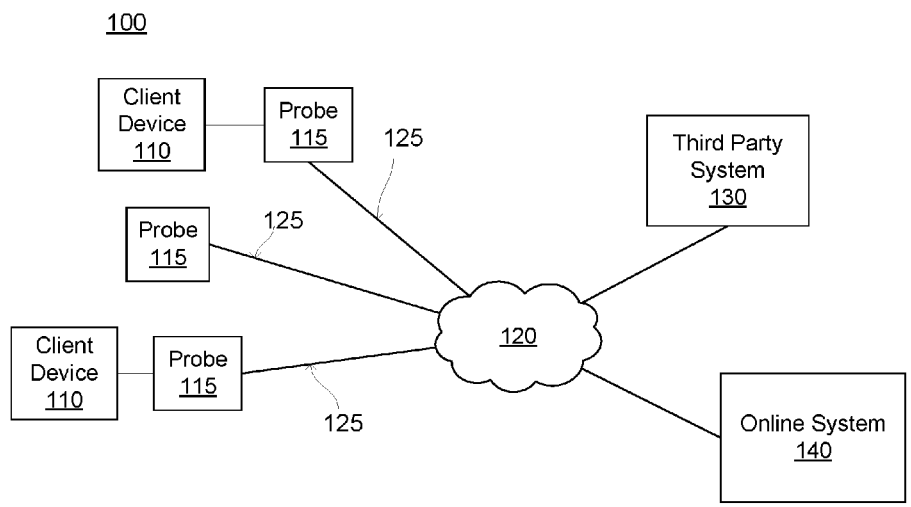
FIG. 1 is a block diagram of a system environment in which an online system and probes capturing technical characteristics of a communication channel operate, in accordance with an embodiment of the invention.

FIG. 1 is a block diagram of a system environment 100 in which an online system 140 operates. The system environment 100 shown by FIG. 1 comprises one or more client devices 110, one or more probes 115 a network 120, one or more third-party systems 130, and the online system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with one or more third party systems 130 or other sources of content. For example, a client device 110 executes a browser application to enable interaction between the client device 110 and a third party system 130 via the network 120. In another embodiment, a client device 110 interacts with a third party system 130 through an application programming interface (API) running on a native operating system of the client device 110, such as IOS® or ANDROID™.

The client devices 110 are configured to communicate via the network 120 through one or more communication channels 125 that couple client devices 110 to the network 120, which may comprise any combination of local area and/or wide area networks, using both wired and/or wireless communication systems. In one embodiment, the network 120 uses standard communications technologies and/or protocols. For example, the network 120 includes communication channels 125 using technologies such as Ethernet, 802.11, worldwide interoperability for microwave access (WiMAX), 3G, 4G, code division multiple access (CDMA), digital subscriber line (DSL), etc. In some embodiments, the network 120 includes a single type of communication channel 125, while in other embodiments the network 120 includes multiple types of communication channels 125. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication channels 125 of the network 120 may be encrypted using any suitable technique or techniques.

One or more systems may maintain and configure the network 120 by specifying or modifying various technical characteristics used by the network 120 to communicate content between client devices 110 and third party systems 130, between client devices 110, or between third party systems 130. For example, a system determines placement of antennas or access points used by client devices 110 to connect to the network 120 to provide a coverage radius of the network or affect a signal strength of a connection to the network for various client devices 110. As another example, a system specifies the communication channels 125 used by the network 120 and client devices 110 to exchange information and configures characteristics of the communication channels 125.

Various probes 115 are coupled to the network 125 via one or more of the communication channels 125 and capture technical characteristics of a communication channel 125. Example technical characteristics of a communication channel 125 include: signal intensity, signal quality, signal to noise ratio, or any other suitable information. Probes 115 capture different technical characteristics for different types of communication channels 125 to provide technical characteristics that most accurately describe different types of communication channels 125. For example, if the network 120 to which a communication channel 125 is coupled is a mobile telephone network, a probe 115 coupled to the communication channel 125 captures technical characteristics describing delivery of data packets communicated via the communication channel 125. As another example, if the network 120 to which a communication channel 125 is coupled is a local area network, a probe 115 coupled to the communication channel 125 capture technical characteristics describing conversion of data from an application into a format for transmission by the network 120. Hence, the probes 115 capture of technical characteristics specific to technologies used by different communication channels 125.

As shown in FIG. 1, a probe 115 may be coupled to a client device 110 used by a user and to a communication channel 125, so the probe 115 establishes a connection between the client device 110 and a communication channel 125 for exchanging data. A probe 115 coupled to a client device 110 captures technical characteristics describing communication of data to and from the client device 110 as the client device 110 transmits and receives data via the communication channel 125. This allows technical characteristics captured by the probe 115 to describe technical characteristics of the communication channel 125 during use of the communication channel 125 by users of the client device 110.

In some embodiments, a probe 115 coupled to a client device 110 comprises a set of instructions included in a storage device of the client device 110 that, when executed by a processor of the client device 110, cause the client device 110 to capture technical characteristics of a communication channel 125 coupled to the client device 110. For example, executing the set of instructions comprising the probe 115 causes a processor of the client device 110 to schedule execution of one or more applications installed on the client device 125 and to capture technical characteristics of the communication channel 125 when the one or more applications are executed. Alternatively, a probe 115 coupled to a client device 110 is a device physically coupled to the client device 110 that has a storage device on which instructions are encoded that, when executed by a processor of the client device 110, cause the client device 110 to capture technical characteristics of a communication channel 125 coupled to the client device 110. Hence, a probe 115 may be physically coupled to a client device 110 or may be installed on a client device 110 itself to capture technical characteristics of a communication channel 125 coupled to the client device 110 during operation of the client device 110.

Additionally, probes 115 may be coupled to the network 120 via a communication channel 125 but not coupled to client devices 110. Probes 115 that are not coupled to client devices 110 may communicate data via the communication channel 125 and capture technical characteristics of the communication channel 125 or may capture technical characteristics of the communication channel 125 without themselves transmitting data. Hence, a probe 115 that is not coupled to a client device 110 may passively capture technical characteristics of the communication channel 125 to which the probe 115 is coupled. For example, a probe 115 coupled to a communication channel 125 but not coupled to a client device 110 captures technical characteristics of the communication channel 125 identifying a number of client devices 110 connected to the communication channel 125, signal strength between the probe 115 and the communication channel 125, one or more metrics of signal quality between the probe 115 and the communication channel, or other suitable information describing the communication channel 125. Alternatively, a probe 115 that is not coupled to a client device 110 includes test data that the probe 115 uses to transmit or to receive data through the communication channel 125 and captures technical characteristics of the communication channel 125 when data is communicated through the communication channel 125.

In some embodiments, probes 115 may be repositioned to different physical locations to capture technical characteristics of a communication channel 125 or of various communication channels 125 at different physical locations. For example, probes 115 are included in vehicles and capture technical characteristics of a communication channel 125 from different physical locations as the vehicles move to different physical locations. In some embodiments, the probes 115 are located in public transportation vehicles, allowing capture of technical characteristics of a communication channel 125 at various physical locations along routes traveled by the public transportation vehicles. Additionally or alternatively, probes 115 are included in other vehicles (e.g., taxis, personal vehicles, or ridesharing vehicles) that do not travel along particular routes, allowing the probes 115 to capture technical characteristics of one or more communication channels 125 at a broader range of physical locations.

In some embodiments, one or more probes 115 are coupled to various components of the network 120 or of the communication channels 125. For example, probes 115 are coupled to different antennae, wireless access points, or other components that comprise the network 120 or a communication channel 125. Probes 115 coupled to different components of a communication channel 125 and to the network 120 may be used in conjunction with each other to capture complementary information describing communication of data between the probe 115 (or a client device 110) and a third party system 130 via the communication channel 125 and the network 120. For example, probes 115 coupled to various components of a communication channel 125 capture characteristics of data transmission between a client device 110 and the network 120.

Additionally, one or more probes 115 may actively communicate data via the communication channel 125 and capture technical characteristics of the communication channel 125 based on data communicated to and from the probe via the communication channel. For example, a probe 115 includes instructions that, when executed by a processor included in the probe 115, exchange data between the probe and one or more third party systems 130 via the communication channel 125. A probe 115 captures technical characteristics of the communication channel 125 as the data is exchanged between the probe 115 and the one or more third party systems 130. Technical characteristics of the communication channel 125 captured by the probe 115 may include characteristics of the third party system 130, allowing the probe to account for configuration of the third party system 130 when data is exchanged.

The probes 115 communicate the captured technical characteristics of one or more communication channels 125 to the online system 140. In various embodiments, a probe 115 communicates technical characteristics of a communication channel 125 to the online system 140 along with a physical location where the probe 115 captured the technical characteristics, a time when the probe 115 captured the technical characteristics, characteristics of a client device 110 that communicated information via the communication channel 125 (e.g., an identifier of an application executing on the client device 110 that communicated information, a model of the client device 110, a type of operating system installed on the client device 110, etc.), or any other suitable information. Additionally, the online system 140 communicates instructions to one or more probes 115 to control operation of the probes 115. For example, the online system 140 communicates instructions to a probe 115 to power on, to power down, or to reset. Instructions communicated to the probe 115 by the online system 140 may also specify protocols for capturing technical characteristics. Hence, in various embodiments, the online system 140 may control data exchanged by various probes 115 configured to transmit and receive data via a communication channel 125 to distribute capture of technical characteristics of the communication channel 125 among probes 115 in different physical locations, among different probes 115 at different times, or among probes 115 communicating data with various third party systems 130. This allows the online system 140 to capture technical characteristics of the communication channel 125, which includes information describing data exchanged between one or more client devices 110 and one or more third party system 130, across a range of locations or times. In some embodiments, the online system 140 communicates instructions to different probes 115 to evenly capture technical characteristics of the communication channel 125 across different time intervals or across different locations.

One or more third party systems 130 may be coupled to the network 120 and exchange information with each other or with various client devices 110 via the network. In one embodiment, a third party system 130 is an application provider communicating information describing applications for execution by a client device 110 or communicating data to client devices 110 for use by an application executing on the client device 110. In other embodiments, a third party system 130 provides content or other information for presentation via a client device 110.

The online system 140 generates one or more performance metrics for one or more communication channels 125 from technical characteristics obtained from the probes 115 and information describing user perception of content provided via the communication channels 125. One or more of the generated performance metrics are generated based on characteristics of data exchanged between one or more probes 115 and one or more third party system 130 via a communication channel 125 (which may include the network 120 to which the probe 115 is coupled via the communication channel 125). In various embodiments, the online system 140 generates a single performance metric, with different values of the performance metric corresponding to user perception of content provided by a communication channel 125 having different technical characteristics. Values of the performance metric may also account for characteristics of data exchanged between various probes 115 (or client devices 110 including probes 115) and one or more third party systems 130 via the communication channel 125. Characteristics of data exchanged between a probe 115 and a third party system 130 include data describing communication of messages from the probe 115 (or from a client device 110) to the third party system 130 (e.g., a number of messages lost during communication, a time to send or to receive messages, etc.), uploading or downloading of files by the probe 115 via the communication channel 125 (e.g., download or upload time, a number or a percentage of files that were not successfully or that were successfully downloaded or uploaded), or other information describing exchange of data between the probe 115 and the third party system 130. To account for different perceptions of content provided by a communication channel 125 by users who have different characteristics, the online system 140 generates models for various sets of users, where users in a set have at least one common characteristic (e.g., a common location, a common age range, a common gender, a common income, etc.). A model generated for a set of users correlates a performance metric with technical characteristics of a communication channel 125, including characteristics of data exchanged between one or more probes 115 and one or more third party systems 130 via the communication channel 125, based on user perception of content provided via the communication channel 125. In various embodiments, the performance metric for the communication channel is a numeric value that is correlated with technical characteristics of a communication channel 125 and characteristics of users by a trained model. As further described in conjunction with FIG. 3, the online system 140 may train a model for a set of users based on user perception of content provided via the communication channel 125 by users having one or more characteristics matching common characteristics of users in the set when the communication channel 125 has different technical characteristics, which include characteristics of data exchanged between one or more probes 115 and one or more third party systems 130 via the communication channel 125. Because the performance metric describes perception of content provided the communication channel, the models generated by the online system 140 allow the user to more efficiently determine how technical characteristics, including characteristics of data exchanged between one or more probes 115 and one or more third party systems 130 via the communication channel 125, of a communication channel 125 affect how users with various characteristics perceive content provided by the communication channel 125 having different technical characteristics, including characteristics of data exchanged between one or more probes 115 and one or more third party systems 130 via the communication channel 125. As further described below in conjunction with FIG. 3, the performance metric and models also allow the online system 140 to identify one or more modifications to a communication channel 125 to a system maintaining the communication channel 125 to improve user perception of content provided to users from one or more third party systems 130 via the communication channel 125. For example, the online system 140 identifies one or more modifications to technical characteristics of the communication channel to increase the performance metric for the communication channel 125 for a set of users or identifies a set of users for whom existing technical characteristics of the communication channel result in at least the threshold performance metric. As another example, the online system 140 identifies one or more modifications to technical characteristics of the communication channel that result in at least a threshold performance metric when content is exchanged with one or more third party systems 130 having at least a threshold characteristic (e.g., third party systems 130 providing video content, third party systems 130 providing gaming content, third party systems 130 allowing users to purchase goods or services). Modifications identified by the online system 140 allow a system maintaining a communication channel 125 to improve user perception of the communication channel 125, which may increase revenue obtained by the system from use of the communication channel 125. Alternatively, the online system 140 identifies modifications to a third party system 130, allowing the third party system 130 to modify exchange of data between the third party system 130 and one or more client devices 110 based on technical characteristics of the communication channel 125 and user perception of content received from or transmitted to the third party system 130 via the communication channel 125; such modifications may increase revenue to the third party system 130 by increasing user interaction or engagement with content or other data provided by the third party system 130.

Figure 2:
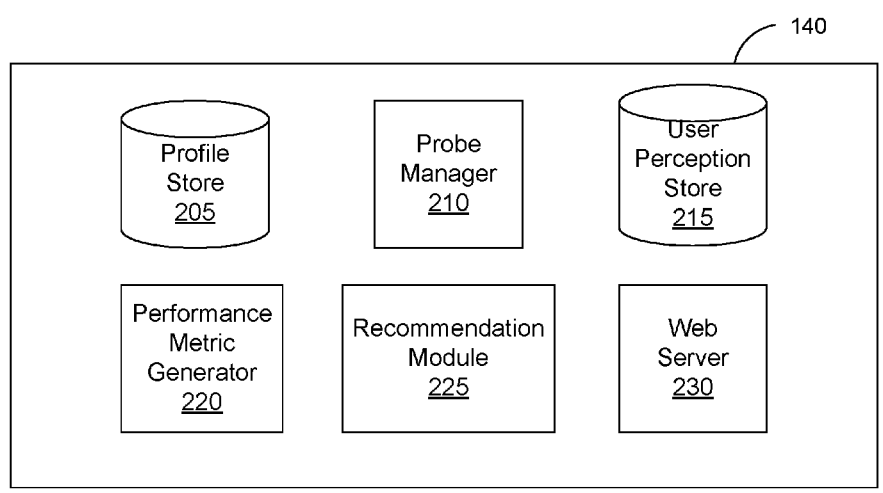
FIG. 2 is a block diagram of an online system generating values for a performance metric for one or more communication channels, in accordance with an embodiment of the invention.

FIG. 2 is a block diagram of an architecture of the online system 140. The online system 140 shown in FIG. 2 includes a profile store 205, a probe manager 210, a user perception store 215, a performance metric generator 220, a recommendation module 225, and a web server 230. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

The profile store 205 includes characteristics of users associated with client devices 110 capable of communicating data via a communication channel 125, characteristics of users capable of being associated with client devices 110 capable of communicating data via one or more communication channels 125, or characteristics or users capable of being associated with third party systems 130 capable of communicating data via one or more communication channels 125. Characteristics of users included in the profile store 205 may be obtained from one or more probes 115 coupled to client devices 110 associated with various users, from user profiles maintained by third party systems 130 providing content to client devices 110 and authorizing the online system 140 to access the user profiles, characteristics of users maintained by a system configuring or managing a communication channel 125, or any other suitable source. Characteristics of users include demographic information (e.g., gender, age range, location, etc.), economic information (e.g., income range, occupation, educational history), personality traits (e.g., interests, opinions, values), or prior actions (e.g., usage history of a communication channel 125). The profile store 205 may associate characteristics with different physical locations, allowing the online system 140 to infer characteristics of a user based on a physical location of a client device 210 from which the user exchanges data via a communication channel 125. For example, the online system 140 obtains information from one or more third party systems 130 maintaining demographic information for different physical locations (e.g., third party systems 130 maintaining market research data, a system associated with a network 120 or a communication channel 125 maintaining accounts of users authorized to access the network 120 or the communication channel 125, a third party system 130 maintaining public records) and stores the demographic information in the profile store 250 in association with physical locations corresponding to the demographic information.

Additionally, the profile store 205 stores information describing sets including users having one or more common characteristics. For example, the profile store 250 includes a set identifier corresponding to a group and associates one or more characteristics with the set identifier to indicate that users in the set have at the characteristics associated with the set identifier. Information describing a set may be provided by a user of the online system 140 or may be received from a system configuring a network 120 or a communication channel 125 and stored by the profile store 205. In some embodiments, the online system 140 generates information describing various sets based on one or more criteria stored in the profile store 205 and stores set identifiers in association with characteristics of users included in each set corresponding to a set identifier. Hence, the profile store 205 allows the online system 140 to identify various sets of users that include users with various common characteristics.

The probe manager 210 communicates instructions to one or more probes 115 from which the online system 140 receives technical characteristics of one or more communication channels 115. Instructions communicated by the probe manager 210 to a probe 115 may be instructions to power on the probe 115, instructions to power down the probe 115, instructions to reset the probe 115, or any other suitable instructions that, when executed by the probe 115, modify operation of the probe 115. Additionally, the probe manager 210 may communicate instructions specifying protocols for capturing of technical characteristics of a communication channel 125 to a probe 115. For example, the probe manager 210 identifies types of data for a probe 115 to communicate via the communication channel 125 (e.g., audio data, video data, data from a particular application or application executing on client devices 125). Additionally, the probe manager 210 may identify technical characteristics of the communication channel 125 captured by a probe 115, times when the probe 115 captures technical characteristics of the communication channel 125, physical locations from which the probe 115 captures technical characteristics of the communication channel 125, or any other suitable information identifying capture of technical characteristics by the probe 115.

In some embodiments, the probe manager 210 communicates instructions to probes 115 or to vehicles including probes 115 identifying physical locations from which the probes 115 capture technical characteristics of a communication channel 125. As described above in conjunction with FIG. 1, probes 115 may be included in various vehicles to capture technical characteristics of a communication channel 125 from different physical locations as the vehicle move from physical location to physical location. The probe manager 210 may communicate requests to probes 115 in vehicles or to client devices 115 included in vehicles also including probes 115 that identify one or more physical locations. In response to receiving a request from the probe manager 210, a vehicle may travel to a physical location identified by the request to capture technical characteristics of a communication channel 125 from the physical location identified by the request. Hence, the probe manager 210 may reposition physical locations of probes 115 to capture technical characteristics of a communication channel 125 from various physical locations. Additionally, if the probe manager 210 is unable to reposition physical locations of one or more probes 115, the probe manager 210 determines whether to communicate instructions to a probe 115 to capture alternative technical characteristics of a communication channel 125, which may include characteristics of data exchanged between one or more probes 115 and one or more third party systems 130 via the communication channel 125. For example, if a physical location of a probe 115 cannot be modified, the probe manager 210 communicates instructions to the probe 115 to exchange data with an alternative third party system 130, increasing the technical characteristics of the communication channel 125 received by the online system 140 from various probes 115. Alternatively, if the probe manager 210 is unable to reposition a physical location of a probe 115, the probe manager 210 communicates an instruction to the probe 115 to not capture technical characteristics.

Further, as described above in conjunction with FIG. 1, the probe manager 210 communicates 210 instructions to different probes 210 so different probes 115 capture technical characteristics of a communication channel 125, which may include characteristics of data exchanged between one or more probes 115 and one or more third party systems 130 via the communication channel 125. Hence, the probe manager 210 communicates instructions to various probes 115 to control data exchanged by various probes 115 configured to transmit and receive data via a communication channel 125, allowing distribution of capture of technical characteristics of the communication channel 125 among probes 115 in different physical locations, among different probes 115 at different times, or among probes 115 communicating data with various third party systems 130. In some embodiments, the probe manager 210 communicates instructions to various probes 115 to evenly distribute capture of technical characteristics among probes 115 in different locations, among probes at different times, or among probes 115 exchanging data with different third party systems 130. This allows the online system 140 to capture technical characteristics of the communication channel 125, which includes information describing data exchanged between one or more client devices 110 and one or more third party system 130, across a range of locations or times. Additionally, the probe manager 210 may track amounts of usage of the communication channel 125 by various probes 115, and may provide instructions to various probes 115 to regulate data exchanged by different probes 115 to maintain less than a threshold amount of usage of the communication channel 125 by multiple probes 115 (e.g., limiting usage of the communication channel 125 so less than a threshold amount is spent for data transmitted and received by multiple probes using the communication channel 125).

The user perception store 215 stores information received from users describing the users' perception of content provided to client devices 110 via one or more communication channels 125 or the users' perception of content obtained from one or more third party systems 130 via one or more communication channels 125 (which may be coupled to one or more networks 120). In various embodiments, the online system 140 maintains one or more surveys in the user perception store 215 including questions requesting user perception of content provided to client devices 110 associated with various users via the communication channel 125 or including questions regarding user perception of content provided to client devices 110 by one or more third party systems 130. For example, a survey provides a scale for ranking a user's perception of different aspects of content and requests the user provide a ranking for different aspects of the content using the provided scale. When the online system 140 receives a response to a survey from a user, the user perception store 215 stores the response in association with a time when the content was provided to the user (or a time when the response was received), in association with technical characteristics of the communication channel 125 used to provide the content for which the survey was received and in association with one or more characteristics of the user from whom the response was received. Accordingly, the user perception store 215 maintains information describing user perception of content provided to a client device 110 via a communication channel 125 in association with characteristics of the user to whom the content was provided and technical characteristics of the communication channel 125 that provided the content. Hence, information in the user perception store 215 allows the online system 140 to identify technical characteristics of a communication channel 125 that provided content to users as well as characteristics of users having various perception of content provided by the communication channel 125.

The performance metric generator 220 generates and stores models for various sets of users that correlate values of a performance metric describing perception of content provided by a communication channel 125 by users in the sets with technical characteristics of the communication channel 125 or perception of content provided by a third party system 130 by users in the sets with technical characteristics of the communication channel 125, as further described below in conjunction with FIG. 3. Hence, a model for a set of users correlates values of the performance metric with different technical characteristics of the communication channel 125 based on information received by the online system 140 describing perception of content by users having characteristics common to users of the set. In various embodiments, the performance metric generator 220 stores multiple models each associated with a different set of users, so each model correlates values of the performance metric with technical characteristics of the communication channel 125 based on perception of content provided by the communication channel 125 by users in sets having different common characteristics. Additionally, models may be associated with different sets of users that correlate values of the performance metric with characteristics of data accessed via third party system 130 (or third party systems 130 having one or more common characteristics) based on perception of content provided by the communication channel 125 by users in sets having different common characteristics.

In various embodiments, the performance metric for the communication channel 125, or for a third party system 130, is a numeric value having different values representing different user perceptions of content provided by the communication channel 125. The performance metric generator 220 generates a model correlating different values of the performance metric with different technical characteristics of the communication channel 125 (or with characteristics of exchange of data with a third party system 130) based on information describing perception of content provided by the communication channel 125 (or by the third party system 130) with various technical characteristics to users in a set. To generate the model for a set of users, the online system 140 trains a model for the set of users based on information from the user perception store 215 associated with users having the common characteristics of users in the set and technical characteristics of the communication channel associated with the information from the user perception store 215. Because values of the performance metric are based on perception of content provided via the communication channel 125 (or by a third party system 130), the generated model correlates user perception of content with different technical characteristics of the communication channel 125 (or characteristics of exchange of data with the third party system 130), allowing the performance metric to describe how technical characteristics of the communication channel 125 (or characteristics of data exchange with the third party system 130) affects how users in a set of users perceive content provided by the communication channel 125 (or by the third party system 130).

In various embodiments, the performance metric generator 220 trains a model for a set of users by capturing training data by providing content to users having the one or more common characteristics of users in the set through the communication channel 125 using different technical characteristics and obtaining information describing user perception of content provided via the communication channel 125 with different technical characteristics. Based on the training data, the performance metric generator 220 determines weights applied to various technical characteristics of the communication channel 125 so the model generates values of the performance metric based on the technical characteristics of the communication channel 125. The performance metric generator 220 stores the trained model in association with information identifying the set, such as a set identifier, allowing subsequent retrieval of the model to generate values of the performance metric for the set based on technical characteristics of a communication channel 125 (or based on characteristics of exchange of data with a third party system 130).

The performance metric generator 220 may train models for multiple sets of users. A trained model is stored in association with a set identifier corresponding to a set of users for which the model was trained (or other information identifying the set of users for which the model was trained). This allows the performance metric generator 220 to maintain models correlating technical characteristics of the communication channel 125 with values of a performance metric based on perception of content provided by the communication channel 125 by users having different characteristics. Models grained for different sets of users may differently weight various technical characteristics of the communication channel 125 or characteristics of users to account for differences in how technical characteristics affect how users with different characteristics perceive content provided by the communication channel 125.

The performance metric generator 220 may train models for multiple sets of third party systems 130. A trained model is stored in association with a third party identifier and a set identifier corresponding to a third party system 130 and to set of users, respectively, for which the model was trained (or other information identifying the set of users or the third party system 130 for which the model was trained). This allows the performance metric generator 220 to maintain models correlating characteristics of data exchanged by the third party system 130 with values of a performance metric based on perception of data exchanged between the third party system 130 and data (e.g., content) provided by the third party system 130 by users having different characteristics. Models grained for different sets of users or for different third party systems 130 may differently weight various characteristics of data exchanged between the third party system 130 and client devices 110 via a communication channel 125 or communication channels 125 or characteristics of users to account for differences in how technical characteristics of a communication channel 125 or characteristics of data exchanged between a third party system 130 and client devices 110 or probes 115 affect how users with different characteristics perceive content provided by the third party system 130.

The recommendation engine 225 identifies one or more modifications to the communication channel 125 based models generated by the performance metric generator 210 for one or more sets of users. In some embodiments, the recommendation engine 225 identifies one or more modifications to characteristics of data exchanged between a third party system 130 and client devices 110 (e.g., communication settings of the third party system 130). For example, the recommendation engine 225 determines a value of the performance metric for a set of users from a model generated for the set and technical characteristics of the communication channel 125 (e.g., technical characteristics of the communication channel 125 during operation, technical characteristics provided by a system configuring the communication channel 125) and determines alternative values of the performance metric for the set of users by applying the generated model to modifications to the technical characteristics of the communication channel 125. By comparing the value of the performance metric to the alternative values of the performance metric, the recommendation engine 225 identifies modifications to one or more technical characteristics of the communication channel 125 resulting in alternative values of the performance metric exceeding the value of the performance metric. Identification of modifications to one or more technical characteristics of the communication channel 125 is further described below in conjunction with FIG. 3.

Additionally, the recommendation engine 225 communicates information describing identified modifications to technical characteristics of the communication channel 125 to a system configuring the communication channel. For example, the recommendation engine 225 communicates information including recommended values for one or more of technical characteristics of the communication channel 125, with an increase in the value of the performance metric relative to the performance metric generated from the technical characteristics of the communication channel 125 associated with each recommended value. In some embodiments, the communicated information also includes an estimated cost or time investment for implementing one or more identified modifications to technical characteristics of the communication channel 125. For example, the recommendation engine 225 maintains one or more tables associating estimated costs or lengths of time with modifications to various technical characteristics, retrieves an estimated cost or a length of time corresponding to a modification of a technical characteristic, and includes the estimated cost or length of time in the information describing the identified modifications to current technical characteristics of the communication channel 125. For example, the recommendation engine 225 includes tables or other data associating estimated costs or length of times with modifications to one or more technical characteristics and communicates information retrieved form the tables or other data to the system configuring the communication channel 120. Alternatively, the recommendation engine 225 communicates estimated costs or lengths of time to modify technical characteristics of the communication channel 125 to result in different values of the performance metric; for example, information communicated to a system configuring the communication channel includes a graph showing values of the performance metric (or changes in the value of the performance metric) against estimated costs (or lengths of time) to modify one or more technical characteristics of the communication channel 125 or to modify one or more characteristics of data exchanged with client devices 110 by a third party system 130.

In various embodiments, the recommendation engine 225 estimates a benefit to a system maintaining the communication channel 125 for modifying one or more of the technical characteristics of the communication channel 125 (e.g., an increase in revenue from users, an increase in user perception of content provided by the communication channel 125, etc.). Additionally, the recommendation engine 225 may estimate a benefit to a third party system 130 for modifying one or more characteristics of exchanging data with client devices 110 (e.g., an increase in user perception of content provided by or obtained from the third party system 130, an increase in user interaction with the third party system 130, an increase in revenue obtained by the third party system 130, etc.). In some embodiments, the recommendation engine 225 ranks modifications to various technical characteristics of the communication channel 125 or to characteristics of data exchanged between the third party system 130 and client devices 110 based on the estimated benefit to the system maintaining the communication channel 125 or to the third party system 130 and provides the ranking of the modifications to the system maintaining the communication channel 125 or to the third party system 130. The ranking may be based on an estimated benefit of various modifications to one or more technical characteristics of the communication channel 125 or to one or more characteristics of data exchanged between the third party system 130 and one or more client devices 110. Example attributes include improvements to user perception of content received via the communication channel 125 or from the third party system 130, increase in revenue to the system maintaining the communication channel 125 or to the third party system 130, time to implement the modifications, or any other suitable attribute.

When the performance metric generator 220 includes various models associated with a various sets of users, the recommendation engine 225 may select a set of users for which one or more models correlate particular characteristics of users with a value of the performance metric (or with at least a threshold value of the performance metric) and communicate information describing the Additionally, the recommendation engine 225 communicates information describing the selected set of users to the system configuring the communication channel 125 or to a third party system 130 providing content to the selected set of users. For example, the recommendation engine 225 communicates the one or more characteristics of users in the selected set to the system configuring the communication channel 125. This allows the system configuring the communication channel 125 to subsequently promote or market the communication channel 125 to users having the characteristics common to users in the selected set to improve user perception of content provided via the online system 125 without modifying technical characteristics of the communication channel 125. Hence, the recommendation engine 225 may identify modifications to users who receive content via the communication channel 125 to improve perception of content received via the communication channel 125 from various users.

The web server 230 links the online system 140 via the network 120 and one or more communication channels 125 to the one or more client devices 110, as well as to the one or more third party systems 130 and to the one or more probes 115. The web server 230 serves web pages, as well as other content, such as JAVA®, FLASH®, XML and so forth. The web server 230 may receive and route messages between the online system 140 and one or more client devices 110, for example, instant messages, queued messages (e.g., email), text messages, short message service (SMS) messages, or messages sent using any other suitable messaging technique or between the online system 140 and one or more probes 115, such as instructions for capturing technical characteristics of a communication channel 125 coupled to the probe 115. A user may send capture technical characteristics of a communication channel 125 to the web server 230 to upload the technical characteristics to the performance metric generator 220. Additionally, the web server 230 may provide application programming interface (API) functionality to send data directly to native client device operating systems (or to operating systems of various probes 115), such as IOS®, ANDROID™, or BlackberryOS.

Identifying Potential Modifications to a Communication Channel

Figure 3:
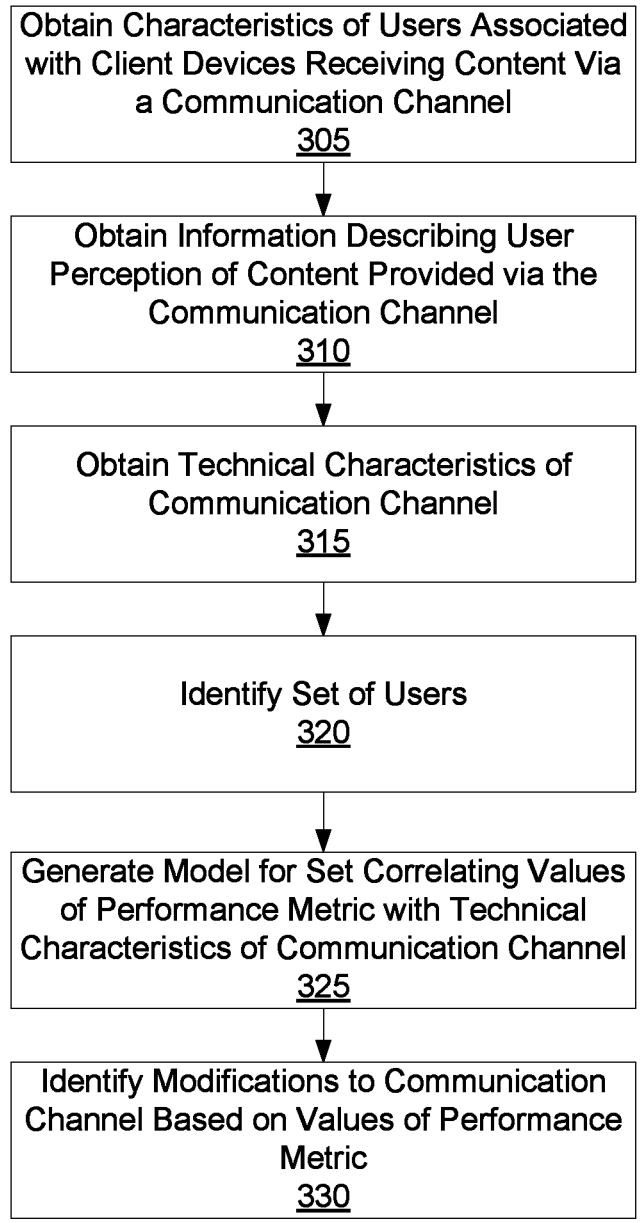
FIG. 3 is a flowchart of a method for identifying potential modifications to a communication channel based on a performance metric for the communication channel based on technical characteristics of the communication channel and user perception of content provided via the communication channel, in accordance with an embodiment of the invention.

FIG. 3 is a flowchart of one embodiment of a method for identifying potential modifications to a communication channel 125 based on a performance metric for the communication channel 125 correlated with technical characteristics of the communication channel 125, which may include characteristics of data exchanged between one or more probes 115 and one or more third party systems 130 via the communication channel 125, and user perception of content provided via the communication channel 125. In various embodiments, the method may include different or additional steps than those described in conjunction with FIG. 3. Additionally, in some embodiments, steps of the method may be performed in different orders than the order described in conjunction with FIG. 3.

As described above in conjunction with FIG. 1, various probes 115 are coupled to a communication channel 125 and capture technical characteristics of the communication channel 125, which may include characteristics of data exchanged between one or more probes 115 and one or more third party systems 130 via the communication channel 125.

A probe 115 may be coupled to a client device 110 and capture technical characteristics of the communication channel 125 as the client device 110 exchanges information via the communication channel 125. Alternatively, a probe 115 is coupled to a communication channel 125 and is not coupled to a client device 110, so the probe 115 passively captures technical characteristics of the communication channel 125 or captures technical characteristics of the communication channel 125 when the probe communicates test data via the communication channel 125. One or more probes 115 may exchange data with one or more third party systems 130 via the communication channel 125 and capture technical characteristics of the communication channel 125, which may include characteristics of data exchanged between the one or more probes 115 and one or more third party systems 130 via the communication channel. Multiple probes 115 may be coupled to the communication channel 125 in different physical locations.

An online system 140 obtains 305 characteristics of users associated with client devices 110 capable of communicating data via a communication channel 125 or characteristics of users capable of being associated with client devices 110 capable of communicating data via the communication channel 125. The obtained characteristics include demographic information (e.g., gender, age range, location, etc.) of users, economic information of users (e.g., income range, occupation, educational history), personality traits (e.g., interests, opinions, values), or prior actions (e.g., usage history of a communication channel 125). Various characteristics may be obtained 305 from profiles maintained by various third party systems 130 (e.g., social networking systems) for users in some embodiments. The online system 140 may obtain 305 the characteristics from information obtained by a probe 115 coupled to a client device 110 that communicated data via the communication channel 125, from information associated with users by a system maintaining the communication channel 125, or from any other suitable source or combination of sources (e.g., public information from an entity regulating network 120 usage or configuration, business reports describing networks 120). Characteristics of users associated with client devices 110 or capable of being associated with client devices 110 may be obtained from one or more other sources, allowing the online system 140 to indirectly obtain 305 the characteristics and to obtain 305 a broader range of characteristics. For example, the online system 140 obtains 305 information from one or more third party systems 130 that maintain demographic information for different physical locations and infers characteristics of users or potential users in different physical locations based on the information from the one or more third party systems 130.

Any suitable characteristics of users or potential users may be obtained 305 by the online system 140 in various embodiments. In addition to demographic information, the online system 140 may obtain 305 characteristics of a physical location including one or more users (e.g., if the physical location is an urban area, a rural area), characteristics of an agreement between users and a system providing a network 120 to which client devices 110 associated with the users establish communication channels 125 (e.g., charges for establishing a communication channel 125 with a network 120, types of agreements for establishing communication channels 125, etc.), and characteristics of client devices 110 associated with users (e.g., models of client devices 110, operating systems used by client devices 110, applications on client devices 110 that communicate data via a communication channel 125, etc.), or any other suitable information. Hence, the obtained characteristics provide the online system 140 with characteristics of users themselves, as well as characteristics describing use of communication channels 125 by users. Hence, the online system 140 may obtain 305 characteristics of users based on information received from probes 115 coupled to various client devices 110 as well as from information maintained by third party systems 130 for different physical locations.

The online system 140 also obtains 310 information describing user perception of content provided to the client devices 110 via one or more communication channels 125 and stores the information describing user perception. The obtained information may also describe user perception of content provided to the client devices 110 from one or more third party systems 130, allowing the online system 140 to obtain 310 information describing how users perceive content obtained from different third party systems 130. For example, the online system 140 provides surveys to various users of client devices 110 that request user input regarding content provided to the client devices 110 via the communication channel 125 or from a third party system 130. Responses to the surveys comprise the information describing user perception of content provided to client devices 110 via the communication channel 125 or from one or more third party systems 130. Information describing user perception of content provided via the communication channel 125 or provided by a third party system 130 may be obtained 310 at different intervals, allowing the online system 140 to obtain 310 information describing user perception of content at different times. Similarly, the online system 140 obtains 310 information describing user perception of content provided by one or more communication channels 125 having different technical characteristics or describing user perception of content provided by one or more communication channels 125 to client devices 120 in different physical locations. Additionally, the online system 140 may obtain 310 information describing user perception of content obtained from one or more third party systems 130 at different intervals or obtained through different communication channels 125. Hence, the online system 140 obtains 310 information describing user perception of content provided by various communication channels 125 having various technical characteristics to users having a variety of characteristics or describing user perception of content obtained from one or more third party systems 130 exchanging data using various characteristics, allowing the online system 140 to maintain information describing user perception of content. The online system 140 stores obtained information describing user perception of content provided to the client devices 110 via one or more communication channels 125 in association with characteristics of a user who provided the information and technical characteristics of a communication channel that provided the content 125 or characteristics of data exchanged between one or more third party systems 130 and client devices 110 or probes 115, allowing the online system 140 to subsequently to identify information describing perception of content by users having various characteristics and describing perception of content provided by communication channels 125 having different technical characteristics or obtained from third party systems 130 with different characteristics for exchanging data.

Additionally, the online system 140 receives 315 technical characteristics of one or more communication channels 125 captured by probes 115 coupled to the one or more communication channels 125. In various embodiments, a probe 115 communicates technical characteristics of a communication channel 125 to the online system 140 along with a physical location where the probe 115 captured the technical characteristics, a time when the probe 115 captured the technical characteristics, characteristics of a client device 110 that communicated information via the communication channel 125 (e.g., an application executing on the client device 110 that communicated information, a model of the client device 110, an operating system of the client device 110, etc.), or any other suitable information. Examples of technical characteristics of a communication channel 125 captured by one or more probes 115 and obtained 315 by the online system 140 are further described above in conjunction with FIG. 1.

In various embodiments, the online system 140 also receives 315 characteristics of data, or content, exchanged between one or more third party systems 130 and client devices 110 or probes 115 captured by probes 115 coupled to communication channels 125 through which the third party systems 130 and the client devices 110 exchange the data. For example, a probe 115 captures various characteristics describing exchange of data between a client device 110 and a third party system 130, such as those described above in conjunction with FIGS. 1 and 2, and communicates the captured characteristics to the online system 140 along with an identifier of the third party system 130, a physical location where the probe 115 captured the technical characteristics, a time when the probe 115 captured the technical characteristics, characteristics of a client device 110 or a probe that exchanged data with the third party system 130, characteristics of a communication channel 125 used to exchange the data, characteristics of the client device 110 or the probe 115 that exchanged data, or any other suitable information. In various embodiments, technical characteristics of a communication channel 125 captured by a probe 115 also include characteristics of data exchanged between the probe 115 and one or more third party systems 130 using the communication channel 125, allowing capture of both the technical characteristics of the communication channel 125 and characteristics of data exchange between third party systems 130 and client devices 110 or probes 115 via the communication channel.

From the information describing user perception of content provided by one or more communication channels 125, or exchanged with one or more third party systems 130, and the obtained technical characteristics of the one or more communication channels 125, or characteristics of data exchanged between client devices 110 or probes 115 and one or more third party systems 130, the online system 140 generates models for one or more sets of users correlating a performance metric describing user perception of content provided by a communication channel 125 with technical characteristics of the communication channel 125 for the sets of users. In some embodiments, the online system 140 generates models for one or more sets of users correlating a performance metric describing user perception of content provided by a third party system 130 (or by a set of third party systems 130 having one or more common characteristics) with characteristics of data exchanged between the third party system and the sets of users. The online system 140 identifies 320 a set of users having one or more common characteristics and generates 325 a model for the identified set that correlates values of a performance metric with technical characteristics of a communication channel 125, or with characteristics of data exchanged between a third party system 130, based on perceptions of users having the one or more common characteristics of content provided by the communication channel 125 having various technical characteristics or exchanged with third party systems 130 using various characteristics. The set of users may be identified 325 as users having common characteristics specified by a user, a third party system 130, or a system associated with a communication channel 125, allowing the user, the third party system 130, or the system to specify characteristics of users for whom the online system 140 generates 325 a model. This allows the user, the third party system 130, or the system associated with the communication channel 125 to evaluate perception of the communication channel 125, or of content provided by the third party system 130, by users having characteristics of interest to the user, to the third party system 130, or to the system associated with the communication channel 125.

In various embodiments, the performance metric for the communication channel 125, or for a third party system 130, is a numeric value having different values that are correlated with different technical characteristics of the communication channel 125, or characteristics of data exchanged by the third party system 130, by the generated model. To generate 325 the model for the set of users, the online system 140 trains a model for a set of users based on obtained information describing perception of content provided via the communication channel 125, or exchanged with the third party system 130, by users having one or more characteristics matching common characteristics of users in the set corresponding to different technical characteristics of the communication channel 125, or corresponding to different characteristics of content exchanged with the third party system 130. Because values of the performance metric are based on perception of content provided via the communication channel 125 or provided by the third party system 130, the generated model correlates user perception of content with different technical characteristics of the communication channel 125, or with different characteristics of data exchanged with the third party system 130, allowing determination of how technical characteristics of the communication channel 125, or characteristics of data exchanged with the third party system 130, affects perception of content provided by the communication channel 125 having various technical characteristics or provided by the third party system 130 via different characteristics for data exchange.

In various embodiments, the online system 140 generates 325 a model for the identified set of users by capturing training data by providing content to users having the one or more common characteristics of users in the set through the communication channel 125 using different technical characteristics, or by exchanging data with one or more third party systems 130 having different characteristics for data exchange, and obtaining information describing user perception of content provided via the communication channel 125 with different technical characteristics, or exchanged with the third party systems 130 having different characteristics. Based on user perception of content when the communication channel 125 providing the content to users has different technical characteristics, or when a third party system 130 exchanging the data has different characteristics, the online system 140 trains a model for the set of users that correlates values of the performance metric with different technical characteristics of the communication channel 125 or with different characteristics of a third party system 130 exchanging data with the client devices 110. For example, training the model generates coefficients that are applied to technical characteristics of the communication channel 125, or characteristics of a third party system 130 exchanging data with client devices 110, and characteristics of users to generate a value for the performance metric. Hence, the model weights technical characteristics of the communication channel 125, or characteristics of third party systems 130 exchanging data with client devices 110, and characteristics of users and combines the weighted technical characteristics, or characteristics of third party systems 130 exchanging data, and characteristics of users to generate a value for the performance metric. The online system 140 stores the generated model in association with information identifying the identified set of users (e.g., characteristics common to users in the identified set).

Figure 4:
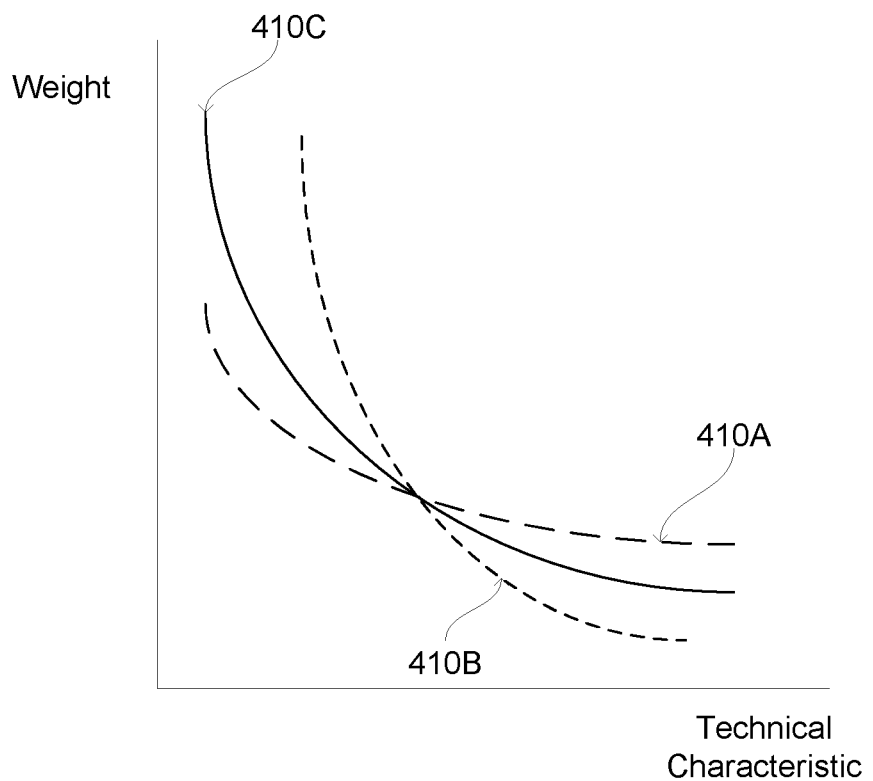
FIG. 4 is a diagram of different weights for a particular technical characteristic of a communication channel generated by the online system for different sets, in accordance with an embodiment of the invention.

In various embodiments, the online system 140 identifies 320 multiple sets of users and generates 325 a model associated with each identified set of users. This allows the online system 140 to maintain models that correlate technical characteristics of the communication channel 125, or characteristics of third party systems 130 exchanging data with client devices 110, with values of a performance metric based on perception of content provided by the communication channel 125, or by characteristics of exchanging data between client devices 110 and the third party systems 130, by users having different characteristics. Models for different sets of users may differently weight various technical characteristics of the communication channel 125 or characteristics of exchanging data between third party systems 130 or client devices 110 or characteristics of users in different sets, allowing identification of effects of different technical characteristics or characteristics of exchanging data with one or more third party systems 130, on how users with different characteristics perceive content provided by the communication channel 125 or exchanged with the one or more third party systems 130. Different models may be generated for different sets of users, accounting for different perceptions of content by users with different characteristics. FIG. 4 shows examples of different weights for a particular technical characteristic of a communication channel generated by the online system 140 for different sets 410A, 410B, 410C of users. As shown in FIG. 4, the weights generated for a model allow the model to establish a relationship between a technical characteristic and the performance metric for different sets of users.

Hence, the generated model allows the online system 140 to determine a value of a performance metric for the identified set of users and specified technical characteristics, or characteristics of exchanging data with a third party system 130, or to determine technical characteristics, or characteristics of exchanging data with a third party system 130, for a specified value of the performance metric and the identified set of users. When the online system 140 generates 325 models for multiple sets of users, the online system 140 is also capable of identifying a set of users from the various models that results in a particular value of the performance metric for specified technical characteristics of the communication channel 125 or for specified characteristics of exchanging data with a third party system 130. Because values of the performance metric are based on user perception of content provided by the communication channel 125 or exchanged with the third party system 130, a model for a set of users allows determination of user perception of content provided via the communication channel 125 when the communication channel 125 has different technical characteristics or when data is exchanged with the third party system 130 using different characteristics. Similarly, the online system 140 may identify a set of users associated with a model that correlates a specific set of technical characteristics of the communication channel 125, or a specific set of characteristics of exchanging data with the third party system 130, with a specific value of the performance metric, allowing identification of characteristics of users likely to have a particular perception of content provided via the communication channel 125 having the specific set of technical characteristics or exchanged with the third party system 130 using the specific set of characteristics.

In some embodiments, the online system 140 identifies 330 one or more modifications to the communication channel 125 based on the generated model. For example, the online system 140 determines a value of the performance metric for the identified set of users from the generated model for the identified set and current technical characteristics of the communication channel 125 and uses the generated model for the identified set to determine alternative values of the performance metric for modifications to one or more of the current technical characteristics of the communication channel 125. Similarly, the online system 140 may determines a value of the performance metric for the identified set of users from the generated model for the identified set and current characteristics for exchanging data with a third party system 130 the generated model for the identified set to determine alternative values of the performance metric for modifications to one or more of the characteristics for exchanging data with the third party system 130. By comparing the value of the performance metric to the alternative values of the performance metric, the online system 140 identifies 330 modifications to one or more of the current technical characteristics of the communication channel 125 (or to current characteristics for exchanging data with the third party system 130) resulting in an alternative value of the performance metric that exceeds the value of the performance metric. In some embodiments, the online system 140 identifies 330 modifications to one or more of the current technical characteristics of the communication channel 125 (or to current characteristics for exchanging data with the third party system 130) that the model correlates with an alternative value of the performance metric at least a threshold amount greater than the value of the performance metric. Alternatively, the online system 140 identifies 330 modifications to one or more of the current technical characteristics of the communication channel 125 (or to one or more of the current characteristics for exchanging data with the third party system 130) that the model correlates with an alternative value of the performance metric having at least a threshold value.

The online system 140 communicates 335 information describing the identified modifications to current technical characteristics of the communication channel 125 to a system configuring the communication channel. For example, the information identifies recommended values for one or more of the current technical characteristics of the communication channel 125 and an increase in the value of the performance metric corresponding to the recommended values for the one or more current technical characteristics. Similarly, the online system 140 may communicate 335 information describing the identified modifications to current characteristics for exchanging data with a third party system 130 to the third party system 130. The online system 140 may communicate 335 information identifying modifications to current technical characteristics of the communication channel 125 (or to current characteristics of exchanging data with a third party system 130) corresponding to greater than a threshold increase in the value of the performance metric for the communication channel 125 (or for exchanging data with the third party system 130) from the model for the identified set of users or may communicate 335 information identifying modifications to current technical characteristics of the communication channel 125 (or modifications to current characteristics for exchanging data with the third party system 130) corresponding to at least a threshold value of the performance metric from the model for the identified set of users. In some embodiments, the communicated information also includes an estimated cost or time investment to implement one or more identified modifications to current technical characteristics of the communication channel 125 (or to characteristics of exchanging data with the third party system 130). For example, the online system 140 maintains one or more tables associating estimated costs or lengths of time with modifications to various technical characteristics, retrieves an estimated cost or a length of time corresponding to a modification of a technical characteristic, and includes the estimated cost or length of time in the information describing the identified modifications to current technical characteristics of the communication channel 125. Alternatively, the online system 140 communicates estimated costs or lengths of time to modify technical characteristics of the communication channel 125, or to perform other modifications to the communication channel 125, to result in different values of the performance metric; for example, the communicated information includes a graph showing values of the performance metric (or changes in the value of the performance metric) against estimated costs (or lengths of time) to modify one or more technical characteristics of the communication channel 125. Including estimated costs or lengths of time to modify one or more current technical characteristics of the communication channel 125 allows the online system 140 to provide the system configuring the communication channel 125 with information for determining how to modify the communication channel 125 over time.

In some embodiments, the online system 140 compares the value of the performance metric for the communication channel 125 having the current technical characteristics (or the value of the performance metric for the third party system 130 having current characteristics for exchanging data with one or more client devices 110) to values of the performance metric for additional communication channels 125 (or for additional third party systems 130) determined by applying the model for the identified set of users to technical characteristics of the additional communication channels 125 (or characteristics for exchanging data with additional third party systems 130). Based on differences between the value of the performance metric for the communication channel 125 (or for the third party system 130) and values of the performance metric for the additional communication channels 125 (or for the additional third party systems 130), the online system 140 identifies 330 modifications to one or more technical characteristics of the communication channel 125 (or characteristics for exchanging data with the third party system 130) and communicates 335 information identifying the modifications to a system configuring the communication channel 125 (or to the third party system 130). As described above, the communicated information may identify estimated costs or lengths of time for the system configuring the communication channel 125 to modify the technical characteristics of the communication channel 125 (or for the third party system 130 to modify characteristics for exchanging data).

In various embodiments, the online system 140 estimates a benefit to the system maintaining the communication channel 125 for modifying one or more of the technical characteristics of the communication channel (e.g., an increase in revenue from users, an increase in user perception of content provided by the communication channel, etc.) or to a third party system 130 exchanging data with client devices 110 for modifying one or more characteristics of data exchange between the third party system 130 and the client devices 110. The online system 140 ranks modifications to various technical characteristics of the communication channel 125 or to characteristics of data exchange between the third party system 130 and client devices 110 based on the estimated benefit to the system maintaining the communication channel or to the third party system 130, respectively. Based on the ranking, the online system 140 selects modifications to the technical characteristics of the communication channel 125 or to characteristics of data exchanged between the third party system 130 and client devices 110. For example, the online system 140 selects modifications having at least a threshold position in the ranking. Alternatively, the online system 140 selects modifications providing at least a threshold benefit. In some embodiments, the online system 140 provides the ranking of the modifications to the system maintaining the communication channel 125 or to the third party system 130. Example attributes on which the ranking may be based include improvements to user perception of content received via the communication channel 125 or from the third party system 130, increase in revenue to the system maintaining the communication channel 125 or to the third party system 130, time to implement the modifications, or any other suitable attribute.

When the online system 140 includes various models associated with a various sets of users, the online system 140 may select a set of users for which one or more models correlate particular characteristics of users with a value of the performance metric (or with at least a threshold value of the performance metric) and communicate information describing the Additionally, the online system 140 communicates information describing the selected set of users to the system configuring the communication channel 125. For example, the online system 140 communicates the one or more characteristics of users in the selected set to the system configuring the communication channel 125. As an example, the online system 140 receives a minimum value of the performance metric and characteristics of the communication channel 125 from a system configuring the communication channel 125. The online system 140 applies generated models for different sets of users to the characteristics of the communication channel 125 and selects one or more sets for which a generated model for the sets correlates a value of the performance metric that equals or exceeds the minimum value. In some embodiments, the online system 140 selects a set of users for which a model correlated with the set provides a maximum value or provides a value of the performance metric that exceeds the minimum value by a maximum amount. Accordingly, characteristics common to users in the selected set specify characteristics of users who have perceptions of content provided via the communication channel 125 having the technical characteristics that exceed perception of content provided via the communication channel 125 having the technical characteristics described by the minimum value of the performance metric. This allows the system configuring the communication channel 125 to subsequently promote or market the communication channel 125 to users having the characteristics common to users in the selected set to improve user perception of content provided via the online system 125 without modifying technical characteristics of the communication channel 125. Hence, the online system 140 may identify modifications to users who receive content via the communication channel 125 to improve perception of content received via the communication channel 125 from various users.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
    obtaining characteristics of users associated with client devices receiving content via communication channels, each client device coupled to a network via a communication channel;
    obtaining information describing user perception of content provided to one or more of the client devices via the one or more communication channels coupling each of the one or more client devices to the network;
    receiving technical characteristics of the one or more communication channels providing the content to the client devices via the network captured by one or more probes coupled to the communication channel;
    identifying a set of users, each user of the set having a common characteristic determined from the obtained characteristics of users associated with client devices receiving content from the network via the communication channels;
    generating a model for the set of users correlating values of a performance metric for the one or more communication channels with technical characteristics of the one or more communication channels based on the obtained information describing user perception of users in the set and the received technical characteristics of the one or more communication channels;
    storing the generated model in association with the common characteristic of the set of users;
    identifying one or more modifications to the one or more communication channels by comparing a value of the performance metric corresponding to application of the generated model to received technical characteristics and to the characteristics of users of the set to values of the performance metric corresponding to application of the generated model to alternative technical characteristics of the one or more communication channels and to the characteristics of the users of the set; and
    communicating information describing the identified one or more modifications to the one or more communication channels to a system configuring the communication channel, the information describing the identified one or more modifications to the one or more communication channels including one or more selected from a group consisting of: estimated costs for the system configuring the one or more communication channels to implement one or more of the modifications, estimated lengths of time for the system configuring the one or more communication channels to implement one or more of the modifications, and any combination thereof.

2. The method of claim 1, wherein receiving technical characteristics of the one or more communication channels providing the content to the client devices captured by one or more probes coupled to the communication channel comprises:
    receiving technical characteristics of the one or more communication channels from one or more probes coupled to client devices and configured to capture technical characteristics of the one or more communication channels when the client devices exchange data via the one or more communication channels.

3. The method of claim 1, wherein receiving technical characteristics of the one or more communication channels providing the content to the client devices captured by one or more probes coupled to the one or more communication channels comprises:
    receiving one or more characteristics of one or more exchanges of data between the client devices and a third party system captured by one or more probes coupled to the one or more communication channels.

4. The method of claim 1, further comprising:
    generating a model for the set of users correlating values of a performance metric for the third party system with characteristics of the one or more exchanges of data between the client devices and the third party system based on obtained information describing user perception of users in the set and the received one or more characteristics of one or more exchanges of data between the client devices and the third party system;
    identifying one or more modifications to characteristics of data exchange between the third party system and the client devices by comparing a value of the performance metric for the third party system corresponding to received characteristics of one or more exchanges of data between the client devices and the third party system to values of the performance metric corresponding to alternative characteristics of one or more exchanges of data between the client devices and the third party system; and
    communicating information describing the identified one or more modifications to the characteristics of one or more exchanges of data between the client devices and the third party system to the third party system.

5. The method of claim 1, wherein receiving technical characteristics of the one or more communication channels providing the content to the client devices captured by one or more probes coupled to the one or more communication channels comprises:
    receiving technical characteristics of the one or more communication channels captured by a probe in association with a physical location where the probe captured the technical characteristics and a time when the probe captured the technical characteristics.

6. The method of claim 1, wherein generating the model for the set of users correlating values of a performance metric for the one or more communication channels with technical characteristics of the one or more communication channels comprises:
    providing content to client devices associated with users having the common characteristic via the one or more communication channels when the one or more communication channels have different technical characteristics;
    capturing training data from users having the common characteristic describing the users' perception of the content provided when the one or more communication channels have different technical characteristics;
    generating weights applied to various technical characteristics of the one or more communication channels based on the captured training data;
    generating weights applied to characteristics of users based on the captured training data; and
    generating the model based on the weights applied to various technical characteristics of the one or more communication channels and the weights applied to characteristics of users.

7. The method of claim 1, wherein identifying one or more modifications to the one or more communication channels by comparing the value of the performance metric corresponding to received technical characteristics to values of the performance metric corresponding to alternative technical characteristics of the one or more communication channels comprises:

determining alternative values of the performance metric by applying the generated model to alternative technical characteristics of the one or more communication channels;

identifying one or more alternative values of the performance metric exceeding the value of the performance metric;

identifying the one or more modifications to the one or more communication channels as alternative technical characteristics of the one or more communication channels corresponding to one or more of the identified alternative values of the performance metric.

8. The method of claim 7, wherein identifying one or more alternative values of the performance metric exceeding the value of the performance metric comprises:

identifying alternative values of the performance metric at least a threshold amount greater than the value of the performance metric.

9. The method of claim 7, wherein identifying one or more alternative values of the performance metric exceeding the value of the performance metric comprises:

identifying alternative values of the performance metric equaling or exceeding a threshold value.

10. The method of claim 1, wherein identifying one or more modifications to the one or more communication channels by comparing a value of the performance metric corresponding to received technical characteristics to values of the performance metric corresponding to alternative technical characteristics of the one or more communication channels comprises:

determining a benefit to the system configuring the one or more communication channels for each of the one or more modifications to the one or more communication channels; and selecting one or more of the modifications to the one or more communication channels based on the determined benefits.

11. A system comprising:

one or more client devices coupled to a network via one or more communication channel, a client device exchanging data with the network via a communication channel;

one or more probes coupled to the one or more communication channels, each probe configured to capture technical characteristics of the one or more communication channels; and an online system coupled to the one or more probes, the online system configured to:

receive technical characteristics of the one or more communication channels captured by the one or more probes;

obtain characteristics of users associated with client devices exchanging data via the one or more communication channels;

obtain information describing user perception of data provided to the client devices via the one or more communication channels;

identify a set of users, each user of the set having a common characteristic determined from the obtained characteristics of users associated with client devices receiving content via the one or more communication channels;

generate a model for the set of users correlating values of a performance metric for the one or more communication channels with technical characteristics of the one or more communication channels based on the obtained information describing user perception of users in the set and the received technical characteristics of the one or more communication channels;

store the generated model in association with the common characteristic of the set of users;

identify one or more modifications to the one or more communication channels by comparing a value of the performance metric corresponding to application of the generated model to the received technical characteristics and to the characteristics of users of the set to values of the performance metric corresponding to application of the generated model to alternative technical characteristics of the one or more communication channels and to the characteristics of the users of the set; and communicate information describing the identified one or more modifications to the one or more communication channels to a system configuring the one or more communication channels, the information describing the identified one or more modifications to the one or more communication channels including one or more selected from a group consisting of: estimated costs for the system configuring the one or more communication channels to implement one or more of the modifications, estimated lengths of time for the system configuring the one or more communication channels to implement one or more of the modifications, and any combination thereof.

12. The system of claim 11, wherein one or more of the probes are coupled to a client device and are configured to capture technical characteristics of the one or more communication channels when the client devices exchange data via the communication channel.

13. The system of claim 11, wherein one or more of the probes are configured to capture characteristics of data exchanged between the one or more probes and a third party system.

14. The system of claim 11, wherein one or more of the probes are coupled to the one or more communication channels and are not coupled to a client device.

15. The system of claim 11, wherein a probe is included in a vehicle and the probe is configured to capture technical characteristics of the one or more communication channels at different physical locations.

16. The system of claim 15, wherein the online system is further configured to transmit instructions to the vehicle including the probe identifying a physical location from which the probe captures technical characteristics of the one or more communication channels.

17. The system of claim 15, wherein the vehicle travels along a particular route of physical locations.

18. The system of claim 11, wherein generating the model for the set of users correlating values of a performance metric for the communication channel with technical characteristics of the one or more communication channels comprises:

provide content to client devices associated with users having the common characteristic via the one or more communication channels when the communication channel has different technical characteristics;

capture training data from users having the common characteristic describing the users' perception of the content provided when the one or more communication channels have different technical characteristics;

generate weights applied to various technical characteristics of the one or more communication channels 1 based on the captured training data;

generate weights applied to characteristics of users based on the captured training data; and generate the model based on the weights applied to various technical characteristics of the one or more communication channels and the weights applied to characteristics of users.

19. The system of claim 11, wherein identifying one or more modifications to the one or more communication channels by comparing the value of the performance metric corresponding to received technical characteristics to values of the performance metric corresponding to alternative technical characteristics of the one or more communication channels comprises:

determine alternative values of the performance metric by applying the generated model to alternative technical characteristics of the one or more communication channels;

identify one or more alternative values of the performance metric exceeding the value of the performance metric; and identify the one or more modifications to the one or more communication channels as alternative technical characteristics of the one or more communication channels corresponding to one or more of the identified alternative values of the performance metric.

20. The system of claim 19, wherein identifying one or more alternative values of the performance metric exceeding the value of the performance metric comprises:

identify alternative values of the performance metric at least a threshold amount greater than the value of the performance metric.

21. The system of claim 19, wherein identifying one or more alternative values of the performance metric exceeding the value of the performance metric comprises:

identifying alternative values of the performance metric equaling or exceeding a threshold value.

* * * * *

UNITED STATES PATENT AND TRADEMARK OFFICE
CERTIFICATE OF CORRECTION

PATENT NO. : 10,250,476 B2  
APPLICATION NO. : 15/213367  
DATED : April 2, 2019  
INVENTOR(S) : Batiz Page 1 of 1

It is certified that error appears in the above-identified patent and that said Letters Patent is hereby corrected as shown below:

In the Claims

In Column no: 29, Line(s) no: 40, Claim 11, delete "channel," and insert -- channels, --

Signed and Sealed this
Twenty-ninth Day of October, 2019

Andrei Iancu
*Director of the United States Patent and Trademark Office*